United States Patent
Tsirkin et al.

(10) Patent No.: US 9,898,326 B2
(45) Date of Patent: Feb. 20, 2018

(54) SECURING CODE LOADING IN A VIRTUAL ENVIRONMENT

(71) Applicant: Red Hat Israel, Ltd., Raanana (IL)

(72) Inventors: Michael Tsirkin, Raanana (IL); Paolo Bonzini, Milan (IT)

(73) Assignee: RED HAT ISRAEL, LTD., Raanana (IL)

(*) Notice: Subject to any disclaimer, the term of this patent is extended or adjusted under 35 U.S.C. 154(b) by 403 days.

(21) Appl. No.: 15/050,601

(22) Filed: Feb. 23, 2016

(65) Prior Publication Data

US 2017/0242719 A1 Aug. 24, 2017

(51) Int. Cl.
- *G06F 11/30* (2006.01)
- *G06F 9/455* (2018.01)
- *G06F 21/60* (2013.01)
- *G06F 9/44* (2018.01)

(52) U.S. Cl.
CPC ........ *G06F 9/45558* (2013.01); *G06F 9/4403* (2013.01); *G06F 21/602* (2013.01); *G06F 2009/45583* (2013.01); *G06F 2009/45587* (2013.01)

(58) Field of Classification Search
CPC ... G06F 9/45558; G06F 21/602; G06F 9/4403
USPC ........................................................ 713/189
See application file for complete search history.

(56) References Cited

U.S. PATENT DOCUMENTS

| | | | |
|---|---|---|---|
| 7,644,271 B1 | 1/2010 | Cherepov et al. | |
| 8,332,635 B2 | 12/2012 | Plouffe, Jr. et al. | |
| 8,627,414 B1 * | 1/2014 | McCune | H04L 9/3234 709/212 |
| 8,914,627 B2 | 12/2014 | Park et al. | |
| 9,037,511 B2 * | 5/2015 | Roth | G06F 21/602 705/1.1 |
| 9,038,176 B2 | 5/2015 | Sallam | |
| 9,075,995 B2 | 7/2015 | England et al. | |
| 9,111,099 B2 | 8/2015 | Paris et al. | |
| 9,607,162 B2 * | 3/2017 | Roth | G06F 21/602 |
| 9,690,947 B2 * | 6/2017 | Bacher | G06F 21/602 |
| 2005/0005101 A1 | 1/2005 | Yenduri | |
| 2013/0085880 A1 * | 4/2013 | Roth | G06F 21/602 705/26.1 |
| 2013/0312099 A1 | 11/2013 | Edwards et al. | |
| 2014/0115652 A1 | 4/2014 | Kapoor et al. | |

(Continued)

OTHER PUBLICATIONS

Intel Corporation "Intel Cloud for All—Technologies" http://www.intel.com/content/www/us/en/cloud-for-all/technologies.html, Nov. 27, 2015, 10 pages.

(Continued)

*Primary Examiner* — Teshome Hailu
(74) *Attorney, Agent, or Firm* — Haynes & Boone LLP

(57) ABSTRACT

Methods, systems, and computer program products are included for loading a code module. A method includes providing, by a hypervisor, a virtual machine that includes a guest operating system. The code module and a signature corresponding to the code module are sent by the guest operating system to the hypervisor. One or more relocations are applied to the code module. The hypervisor verifies the signature corresponding to the code module. After verifying the signature, the hypervisor allows the guest operating system to execute the code module.

20 Claims, 5 Drawing Sheets

(56) References Cited

U.S. PATENT DOCUMENTS

| | | | |
|---|---|---|---|
| 2015/0332048 A1* | 11/2015 | Mooring | G06F 21/567 726/1 |
| 2015/0347763 A1* | 12/2015 | Roth | G06F 21/602 713/189 |
| 2016/0148001 A1* | 5/2016 | Bacher | G06F 9/45558 713/189 |
| 2016/0294559 A1* | 10/2016 | Dabak | H04L 9/3247 |

OTHER PUBLICATIONS

Intel, "Intel Kernel Guard Technology", https://01.org/intel-kgt/overview, Nov. 27, 2015, 7 pages.

Raghu Yeluri et al., "Trusted Docker Containers and Trusted VMs in OpenStack" https://01.org/sites/default/files/openstacksummit_vancouver_trusteddockercontainers.pdf, Nov. 27, 2015, 16 pages.

* cited by examiner

SECURING CODE LOADING IN A VIRTUAL ENVIRONMENT

FIELD OF DISCLOSURE

The present disclosure generally relates to virtualization, and more particularly to code loading in a virtual environment.

BACKGROUND

A host machine (e.g., computer or server) is typically enabled to simultaneously run one or more virtual machines using a software application known as a hypervisor. The hypervisor allocates portions of the host machine's resources to each of the virtual machines. The hypervisor virtualizes the underlying hardware of the host machine or emulates hardware devices, making the use of the virtual machine transparent to a local or remote client. Typically, a hypervisor manages allocation and virtualization of computer resources and performs context switching, as may be necessary, to cycle between various virtual machines, such that many virtual machines may be run simultaneously.

Each virtual machine may function as a self-contained platform, running applications and its own operating system that is referred to as a guest or guest operating system. Guests may be accessed by clients to perform computing tasks. Conventionally, each guest operating system includes a kernel that performs important tasks such as executing processes and handling interrupts.

BRIEF SUMMARY

This disclosure relates to code loading in a virtual environment. Methods, systems, and techniques for code loading are provided.

According to an example, a method of code loading includes providing, by a hypervisor, a virtual machine that includes a guest operating system; sending, by the guest operating system, one or more symbol entries, a signed code module and one or more relocation entries corresponding to the signed code module; receiving, at the hypervisor, the one or more symbol entries, the signed code module and the one or more relocation entries; verifying, by the hypervisor, the signed code module; applying, using the one or more symbol entries, one or more relocations of the one or more relocation entries to the signed code module; and after verifying the signed code module, allowing the guest operating system to execute the signed code module.

According to an example, a non-transitory machine-readable medium includes machine-readable instructions executable to cause a machine to perform operations comprising: providing, by a hypervisor, a virtual machine that includes a guest operating system; communicating, from the guest operating system to the hypervisor, a code module, a signature corresponding to the code module, a decryption key, and a symbol entry; verifying, by the hypervisor, the code module; after verifying the code module, applying a relocation to the code module, wherein the relocation is at least partly based on an address provided by the symbol entry; and after applying the relocation, allowing the guest operating system to execute the code module.

According to an example, a code loading system includes a non-transitory computer readable medium that stores a signed code module; a processor that executes a hypervisor to provide a virtual machine that includes a guest operating system; the guest operating system to send, to the hypervisor, one or more symbol entries, the signed code module, a key corresponding to the signed code module, and one or more relocation entries corresponding to the signed code module; the hypervisor to: receive the one or more symbol entries, the signed code module, the key, and the one or more relocation entries; verify, using the key, the signed code module; after verifying the signed code module, apply a relocation to the signed code module, wherein the relocation corresponds at least in part to an address provided by the one or more symbol entries; and after applying the relocation, provide the guest operating system with access to execute the code module.

Embodiments of the present disclosure and their advantages are best understood by referring to the detailed description that follows.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
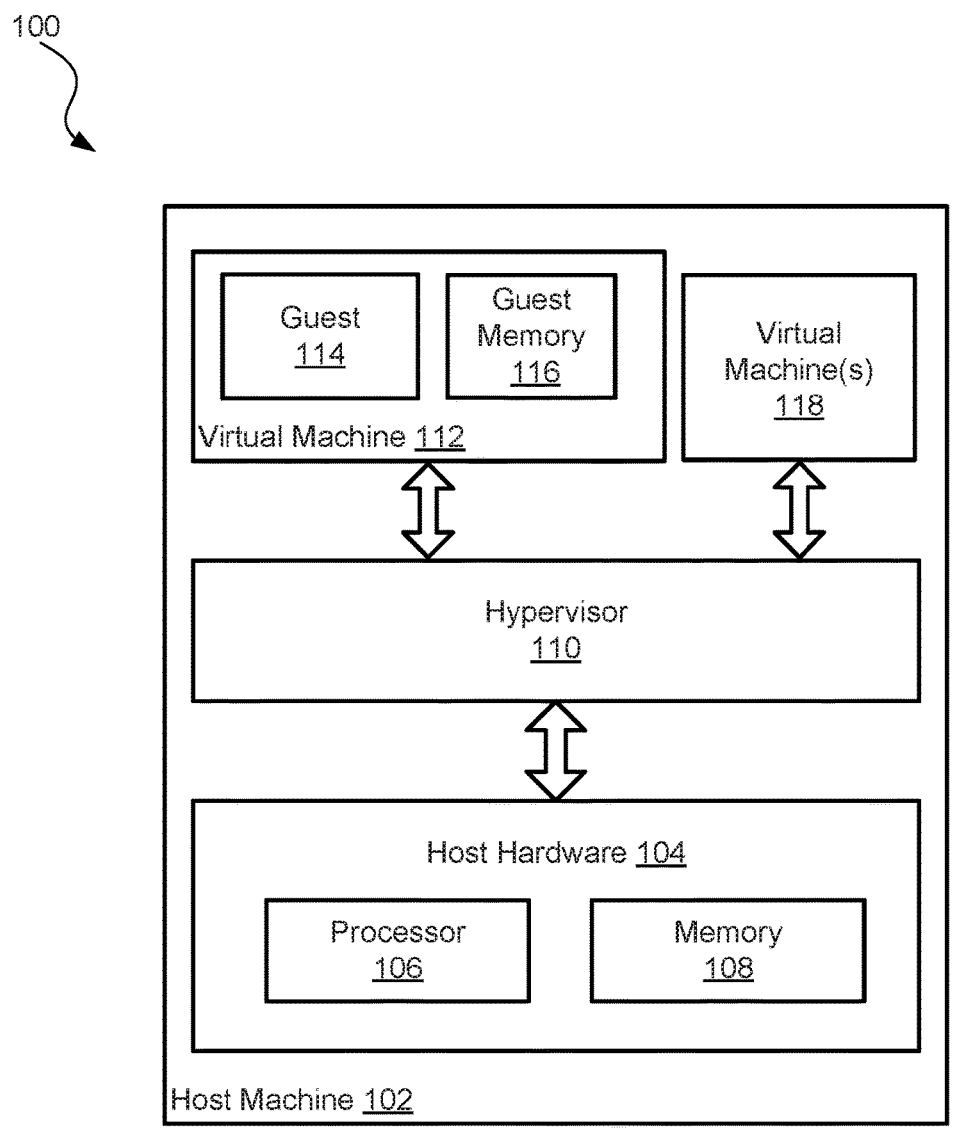
FIG. 1 is an organizational diagram illustrating a system for securing code loading in a virtual environment, in accordance with various examples of the present disclosure.

FIG. 1 is an organizational diagram illustrating a system for securing code loading in a virtual environment, in which various aspects of the present disclosure may be implemented.

The system 100 includes a host machine 102. The host machine 102 includes host hardware 104. Host hardware 104 includes physical elements such as a processor 106, memory 108, and may also include other input/output (I/O) devices, such as those illustrated in FIG. 4.

The host machine 102 includes a hypervisor 110, which also may be referred to as a virtual machine monitor. Hypervisor 110 may include executable instructions that are stored in the memory 108 and executed by the processor 106. In some examples, the hypervisor 110 is run on top of a host operating system. In other examples, the hypervisor 110 is run directly on host hardware 104 without the use of a host operating system.

In the present example, hypervisor 110 provides one or more virtual machines, such as the virtual machine 112 and virtual machine(s) 118. In other examples, there may be any number of virtual machines. Each virtual machine is an underlying virtualization of host machine 102. Each virtual machine may be, for example, a hardware emulation, full virtualization, para-virtualization, and operating system-level virtualization virtual machine.

The hypervisor 110 manages system resources, including access of virtual machines (e.g., virtual machine 112 and virtual machine(s) 118) to the host hardware 104, such as processor 106, memory 108, and other hardware devices. In some examples, the system resources that may be provided to each virtual machine include a virtual CPU, guest memory, one or more virtual devices, such as a network device, an emulated NIC or disk, virtual firmware such as a Basic Input/Output System (BIOS) and/or an Extensible Firmware Interface (EFI), and so forth.

In the present example, the hypervisor 110 provides a guest 114, also called a guest operating system, which runs on the virtual machine 112. The guest 114 running on a virtual machine 112 may include a same or a different operating system as a host operating system running on the host machine 102. Moreover, each of the virtual machine(s) 118 may also include a guest that provides a same operating system or a different operating system as the host operating system and/or the guest 114. Accordingly, the host machine 102 may run multiple operating systems concurrently and in isolation from other operating systems.

The guest 114 is structured to include a kernel, which may also be referred to as a guest kernel. The kernel is the core of the guest 114 and is structured to manage important tasks of the virtual machine 112. For example, the kernel may be used for allocating guest memory 116, sending and receiving I/O, managing a file system of the guest 114, handling interrupts, providing access to one or more processors to execute application instructions, and so forth. In the present example, the kernel communicates with the processor 106 (or a virtual processor allocated to the virtual machine 112) and other virtual machine 112 devices to process I/O requests corresponding to the virtual machine 112.

In some examples, the guest 114 is structured as stand-alone kernel, while in other examples the guest 114 is structured with a kernel as well as one or more additional applications that are built on top of the kernel. Examples of guests include, for example, LINUX, UNIX, DOS, OS/2, IOS, ANDROID, WINDOWS, and so forth. Accordingly, the guest 114 may include features such as a graphical user interface, file system, and various user applications. Each virtual machine 118 may be structured with a guest operating system that includes a kernel.

In the present example, the kernel is structured to include drivers. For example, device drivers corresponding to devices of the virtual machine may be loaded into the kernel. These drivers are examples of code modules that may be loaded into the kernel. Other examples of code modules that may be loaded into the kernel also include other types of code modules. For example, a code module may be a library or even an entire kernel. Accordingly, the kernel that is included in the guest 114 is structured to expand to encompass additional code modules. Code modules may include any data and/or executable instructions. Examples of techniques for loading code modules into the kernel are provided in greater detail with respect to FIGS. 2, 3A, and 3B.

The hypervisor 110 provides a guest memory 116 that is allocated to the guest 114. In the present example, the guest memory 116 is a virtualized portion of the memory 108. The guest memory 116 may include one or more guest memory pages that are mapped to memory pages of the memory 108 via one or more mappings, such as page tables. The mapping may be provided by the hypervisor 110. As an example, page tables may include Extended Page Tables (EPT).

In the present example, the hypervisor 110 is structured to have access to read, write, and/or execute instructions on the guest memory 116. For example, the hypervisor 110 may access areas of the guest memory 116 that are allocated to the kernel of the guest 114, but that are restricted from other portions of the guest 114. Further, the hypervisor 110 may also be allocated other areas of memory 108 that are not mapped to the guest memory 116. These other areas of memory may be inaccessible to the guest 114 (both the kernel as well as non-kernel portions of the guest 114). Accordingly, the hypervisor 110 is structured with access to memory for performing read, write, and/or execute operations.

The guest memory pages may be fully or partially controlled by the guest 114. For example, the kernel of the guest 114 may allocate memory pages from the guest memory 116 to run processes and execute applications on the virtual machine 112. Each virtual machine 118 may include a same or different guest memory that is mapped to a portion of the memory 108.

In the present example, the guest 114 is structured to include one or more code modules that may be loaded into the kernel of the guest 114, one or more encryption keys that are used to generate signatures corresponding to the code modules, and one or more decryption keys that may be distributed to other applications for verifying the code modules. For example, the one or more encryption keys that may be used to generate signatures may be referred to as private keys. The one or more keys decryption keys that may be used to verify the code modules may be referred to as public keys. Each private key that is used to sign a code module may be structured as a member of a key pair with a public key that is used to verify the code module.

In the present examples, the guest 114 is structured to provide the hypervisor 110 with one or more of the public keys, one or more of the code modules, and one or more of the signatures, such that the hypervisor 110 may validate the code modules on behalf of the guest 114. In some examples, code modules, keys, and signatures may be stored in the guest memory 116 and/or other portions of the memory 108. For example, keys, code modules and signatures may be stored in the guest memory 116. Keys that are provided to the hypervisor 108 may be stored in other portions of the memory 108 that are inaccessible to the guest 114.

In the present example, the guest memory 116 includes guest memory pages that are allocated to the kernel. These memory pages that are allocated to the kernel may be protected from access by other applications running on the virtual machine 112. In some examples, the memory pages allocated to the kernel may be structured on the virtual machine 112 as pages that are protected from access (e.g., read, write, and/or execute access) by non-kernel applications. For example, the memory pages of the guest memory 116 may include permissions that may be modified by the kernel, such that read, write, and/or execute access to the memory pages may be restricted. In some examples, the memory pages are structured to include one or more flags or other permissions structures that are be modified to restrict access to the memory pages. For example, the permissions may be structured as one or more flags that may be set to on or off values by the kernel to modify the permissions.

The kernel may also distinguish between the kernel and non-kernel portions of the guest. For example, the guest 114 may include a graphical user interface and other applications that run on top of a kernel. The kernel may modify permissions of an area of memory that includes one or more memory pages in the guest memory 116. The permissions may be modified such that the area of guest memory 116 may be writable and executable by the kernel, but not writable or executable by non-kernel portions of the guest 114. Similarly, the kernel may modify permissions of the one or more memory pages in the area of guest memory 116 to allow the non-kernel portions of the guest 114 to write to the one or more memory pages and/or execute instructions stored on the one or more memory pages.

The guest memory pages in the guest memory 116 may be allocated for storing data and/or code of files, such as data files and binary files. Binary files may be formatted in the Executable and Linkable Format (ELF) (formerly called the Extensible Linking Format), such that they may be executed by the guest 114. Binary files may also be referred to as executable files, object files, programs, and/or applications. The binary files may include sections that are allocated to one or more memory pages of the guest memory 116. In the present example, code modules are structured as one or more binary files and/or one or more data files.

The guest 114 is structured to include a guest loader. During runtime of the guest 114, the guest loader is structured to dynamically allocate guest memory 116 and load code and/or data corresponding to the binary files into the allocated memory to prepare the binary files for execution. The binary files may be loaded to different memory addresses each time they are executed, rather having fixed memory addresses in the guest memory 116. In some examples, the code corresponds to executable instructions of code modules (e.g., one or more kernel modules, device drivers, kernels, and so forth).

The binary files are structured to include at least two parts: a first part that includes code and/or data of the binary, and a second part that includes relocation entries. The second part that includes relocation entries may be referred to as a relocation section. The relocation section of the binary file may store one or more relocation entries.

Relocation entries reference relative locations of code and/or data of the binary, such that during runtime the code and/or data referenced by the relocation entries may be updated. In the present example, each relocation entry is structured to reference a location of code and/or data in symbolic form. For example, a relocation entry may include a symbol string, a reference/mapping to a place in the code and/or data of the binary, and a relative address. A symbol string may be, for example, an alphanumeric string corresponding to a function name or module name. The relative address may be, for example, an offset from the base address of the function or module corresponding to the symbol string. In some examples, the offset is stored at the referenced place in the code and/or data of the binary, rather than in the relocation entry itself.

In the present example, the guest 114 is structured with a symbol table that includes one or more symbol table entries. Each symbol table entry may be structured to reference a location of code and/or data in symbolic form. For example, a symbol table entry may include a symbol string and a corresponding address. The address may be referred to as a base address and/or a virtual address. While the "symbol table entries" phrase includes the term "table," it is not necessary that the entries be structured in a table form. Accordingly, the symbol table entries may also be referred to as "symbol entries."

The guest loader is structured to update the relative addresses specified in the code and/or data of the binary files to fixed/absolute addresses when the binary files are loaded for execution. The relative addresses in the code and/or data of the binary files may be updated by computing a fixed/absolute address from the base addresses provided by the symbol table entries and the offsets provided by the relocation entries.

Each relocation entry may be structured to include a relative address that is an offset from a base address. Each symbol table entry may be structured to provide a particular virtual address to use as the base address. The guest loader is structured to match symbol strings from the relocation section of the binary file with symbol strings of the symbol table entries to identify which base address corresponds to each offset. Accordingly, upon determining a match between a symbol string of a relocation entry and a symbol string of a symbol table entry, the code and/or data location referenced in the relocation entry is updated to store the address that results from adding the base address provided by the symbol table entry to the corresponding offset provided by the relocation entry. Accordingly, the code and/or data of the binary file are updated, by the guest loader, to reference fixed/absolute addresses in memory.

The modifying of code and/or data of the binary file based on the symbol table entries and the relocation entries may be referred to as applying relocations. In other examples, relocations may be applied to the code and/or data of the binary file in other ways. For example, applying relocations may refer to any changing of the addresses included in the code and/or data of the binary file that is based on processing relocation entries corresponding to the binary file. In some examples, applying relocations refers to applying changes requested by one or more relocation entries included in the binary file.

Figure 2:
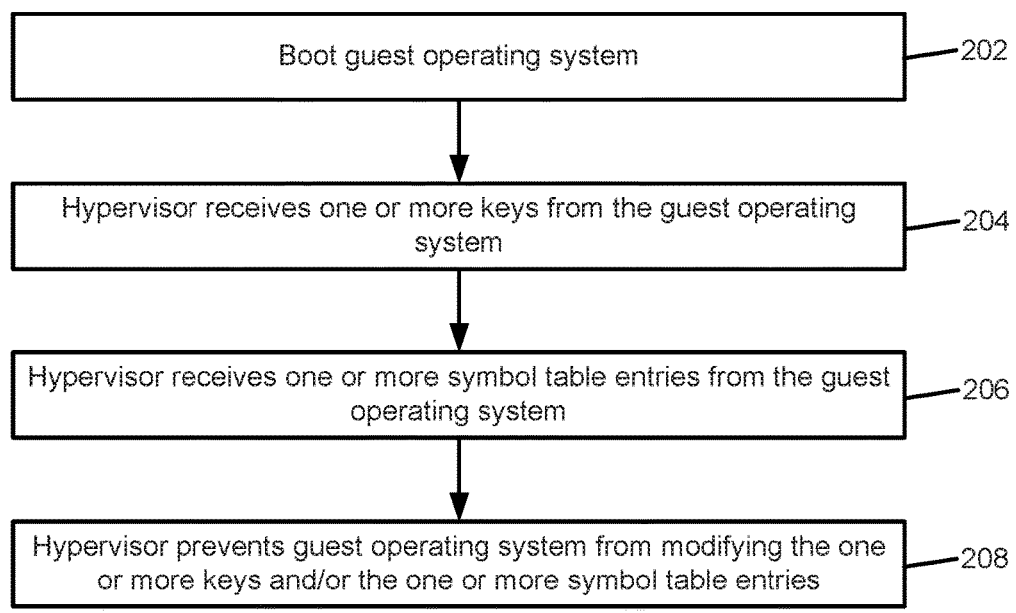
FIG. 2 is a flow diagram illustrating providing of one or more keys and one or more symbol table entries from a guest operating system to a hypervisor, in accordance with various examples of the present disclosure.

FIG. 2 is a flow diagram illustrating providing of one or more keys and one or more symbol table entries from a guest operating system to a hypervisor, according to some examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by a virtual environment that is provided by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 202, the hypervisor creates a virtual machine and boots a guest operation system (which also may be referred to as a guest) that runs on the virtual machine. The guest operating system may include a kernel as well as additional applications that are built on top of the kernel. The hypervisor allocates resources of a host computer to the virtual machine. The resources may include, for example, a portion host memory that is provided to the virtual machine as a guest memory, host processing resources, and one or more other host devices. In some examples, the boot process includes execution of virtual firmware, such as a virtual BIOS or UEFI, to load the devices, such that the devices may be accessed by the guest.

At action 204, during the boot process, the guest operating system provides the hypervisor with one or more trusted keys that may be used for signature verification. The one or more keys may be referred to as public keys or decryption keys.

At action 206, one or more symbol table entries are sent to the hypervisor from the guest operating system. The symbol table entries may be included with the one or more keys or provided separately from the one or more keys. In some examples, one or more symbol table entries maintained by the guest kernel may be provided from the guest kernel to the hypervisor in a table or list structure. Each symbol table entry may include a symbol string and a memory address, which may be referred to as a symbol address.

At action 208, the hypervisor prevents the guest operating system from modifying the one or more keys and the one or more symbol table entries that have been provided to the hypervisor. The guest operating system may be similarly prevented from providing additional keys and/or symbol table entries to the hypervisor. In other examples, however, the guest operating system may be prevented from modifying the one or more keys and the one or more symbol table entries that were previously provided; however, the hypervisor may allow the guest operating system to provide additional symbol table entries that do not have symbols that match symbols of previously provided symbol table entries.

In the present example, the guest operating system is prevented from modifying and/or adding keys and symbol table entries outside of a boot process of the guest operating system. Accordingly, the hypervisor may accepts keys and/or symbol table entries and modifications to the entries in step 204 during the guest boot process, but prevent the guest operating system from modifying and/or adding keys and/or symbol table entries outside of the boot process. Thus, for the guest operating system to provide the hypervisor with updated keys and/or symbol table entries, the guest operating system may be reset to provide the updates during a next guest boot sequence.

Figure 3A:
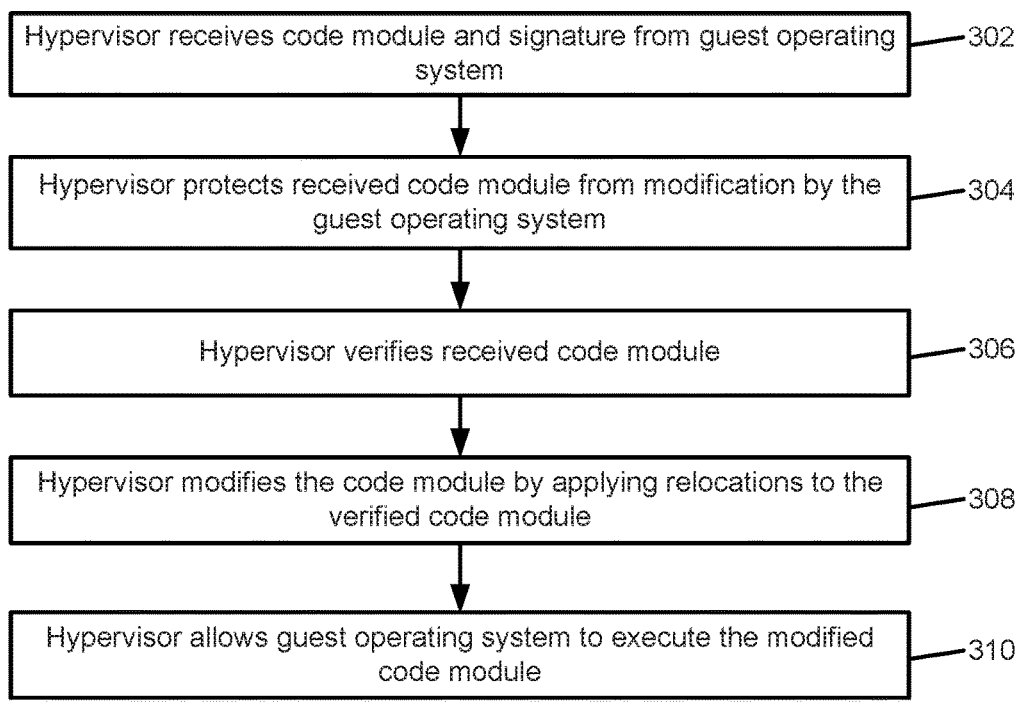
FIG. 3A is a flow diagram illustrating loading and verifying a code module, in accordance with various examples of the present disclosure.
Figure 3B:
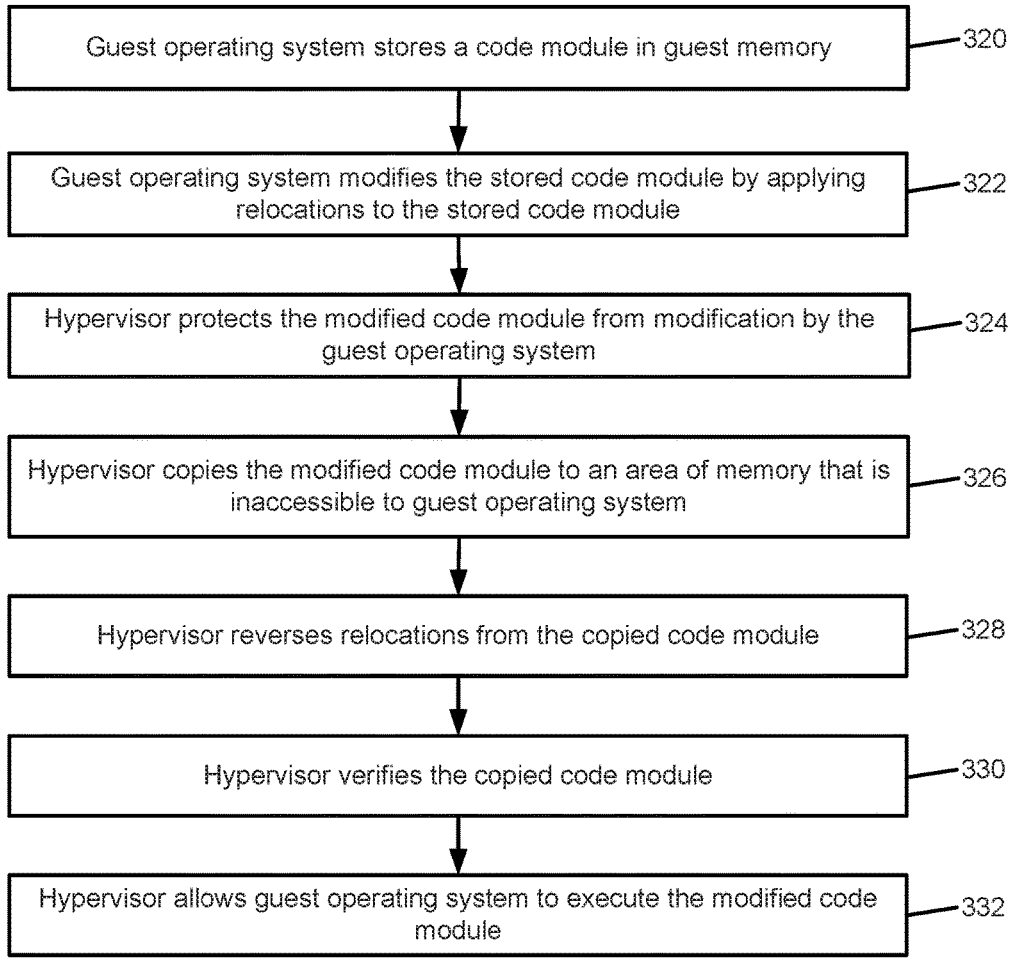
FIG. 3B is a flow diagram illustrating loading and verifying a code module, in accordance with various examples of the present disclosure.

FIGS. 3A and 3B each provide techniques for verifying one or more code modules by the hypervisor. FIG. 3A corresponds to a verification of the code module by a hypervisor prior to applying relocations. FIG. 3B corresponds to a verification of the code module by a hypervisor after applying relocations. These techniques are described in further detail, below.

FIG. 3A is a flow diagram illustrating a method for loading and verifying a code module, in accordance with various examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 302, the guest operating system sends the hypervisor a code module and a signature corresponding to the code module. The code module and the signature may together be referred to as a signed code module. The hypervisor receives the code module and the signature. The code module and signature may be sent in a single communication or in separate communications.

In some examples, the code module and/or signature are communicated by sending their content from the guest operating system to the hypervisor. In other examples, the code module and/or signature are communicated by sending an address or other reference to an area of memory where the code module and/or signature are located, such that the hypervisor may access the code module and/or signature at the referenced location.

In some examples, the guest operating system triggers the sending of the code module and/or signature to the hypervisor when an instruction is executed by the kernel of the guest operating system to load the code module. For example, the kernel may include instructions that are executed to load a driver, dynamic library, or other kernel module. Accordingly, upon executing the instructions, the guest operating system may send the code module and a signature corresponding to the code module to the hypervisor to verify the code module prior to the code module being loaded into the kernel.

At action 304, the hypervisor protects the received code module from modification by the guest operating system. In some examples, the hypervisor stores the received code module in a portion of hypervisor memory that is inaccessible to the guest operating system. For example, the hypervisor may store the received code module in one or more memory pages of a host memory that are allocated to the hypervisor and are not mapped to the guest memory. In this example, the guest operating system may be unable to read, write, and execute instructions of the received code module.

In other examples, the hypervisor stores the received code module in a portion of the guest memory that is protected from write operations by the guest operating system. For example, the received code module may be stored in one or more memory pages in the guest memory that are marked by the hypervisor or kernel as non-writable by the guest operating system. In some examples, the portion of the guest memory may also be marked by the hypervisor as non-readable and/or non-writable by the guest operating system.

In yet other examples, if the guest operating system sent the hypervisor a reference to a location of the code module in guest memory, the hypervisor may modify the permissions of the guest operating system, such that the guest operating system is prevented from performing write operations at the location. For example, the hypervisor may modify permissions of one or more memory pages in the guest memory that store the received code module to remove the guest operating system's write access privileges. In some examples, the hypervisor may further prevent the guest operating system from reading and/or executing the instructions of the received code module by modifying the permissions of the one or more memory pages to remove guest operating system read and/or execute access privileges.

Accordingly, the received code module is protected from being modified by the guest operating system.

At action 306, the hypervisor verifies the received code module. The verification may be performed by inputting the public key corresponding to the guest operating system (e.g., a key provided in action 204) and the signature corresponding to the received code module into a decryption algorithm to decrypt the signature.

In the present example, the signature for the code module is a cryptographic string that is produced by inputting the code module and a private key of the guest operating system into a signing algorithm. The private key corresponds to a public key that is a member of a same key pair as the private key. In the present example, the public key was previously provided to the hypervisor by the guest operating system (e.g., as described with respect to action 204). In some examples, a hash or digest corresponding to a code module may be included in the signature. The hash or digest may represent a compacted representation of the code module, which may enable faster authentication/verification of the code module by the hypervisor.

The decrypted signature may be compared with the received code module to determine a match. In some examples, the decrypted signature is compared via a byte by byte matching with the received code module. In other examples, the decrypted signature includes a hash corresponding to the received code module. In these examples, the hypervisor may calculate a hash corresponding to the received code module and compare the hash with the hash obtained from the decrypted signature.

Accordingly, the hypervisor determines whether the signature matches the received code module. In the event of a successful match, the hypervisor identifies the received code module as verified. Otherwise, if the signature does not match the received code module, the hypervisor may reject/abort a load of the received code module. The hypervisor may notify the guest operating system that there is an error corresponding to the loading of the received code module. The hypervisor may also log an error corresponding to the verification failure.

If the hypervisor was able to verify the received code module, the method may proceed at action 308.

At action 308, after the hypervisor has verified the received code module, the hypervisor may apply relocations to the verified code module using the symbol table entries (e.g., the symbol table entries received from the guest operating system at action 206) and one or more relocation entries stored in the received code module.

In the present example, the hypervisor applies the relocations by matching the symbol strings included in the relocation entries of the verified code module with the symbol strings of the symbol table entries. For example, a relocation entry may include a symbol string, a relative address that is an offset from a base address, and a pointer to a location in the code/data of the verified code module. A symbol table entry may include the same symbol string and a particular virtual address to use as the base address. For each relocation entry that includes a symbol that matches a symbol included in a symbol table entry, the offset provided by the relocation entry is added to the base address provided by the symbol table entry. The address that results from the addition of the base address and the offset is stored at the location referenced by the relocation entry. Accordingly, the code and/or data of the verified code module is updated to specify a fixed/absolute address.

The hypervisor may similarly apply relocations to other portions of the code and/or data based on the matching between the symbol table entries and the relocation entries, the adding of the base addresses and offsets, and the updating of the code and/or data with the results of the addition. In other examples, relocations may be applied to the verified code module in other ways.

At action 310, after applying the relocations to the verified code module, the hypervisor allows the guest operating system to execute the modified code module.

In some examples, if the modified code module is stored in an area of memory that is inaccessible to the guest operating system (e.g., the modified code module is stored in an area of a memory that is not mapped to the guest memory), the hypervisor may write the modified code module to an area of guest memory (e.g., one or more guest memory pages) that is executable by the guest operating system.

In other examples, if the modified code module is stored in a portion of guest memory for which the guest operating system does not have execute access privileges, the hypervisor may modify access privileges of an area of guest memory (e.g., one or more guest memory pages) that stores the modified code module to provide the guest operating system with execute access privileges.

In yet other examples, if the modified code module is stored in a portion of guest memory for which the guest operating system does not have execute access privileges, the hypervisor may write the modified code module to an area of guest memory (e.g., one or more guest memory pages) that is executable by the guest operating system.

FIG. 3B is a flow diagram illustrating a method for loading and verifying a code module, in accordance with various examples of the present disclosure. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. In some examples, the method is performed by the system 100 illustrated in FIG. 1. For example, the method may be performed on the host machine 102. In some examples, the order of the actions described below may also be performed according to alternative orderings. In yet other examples, additional actions may be added and actions that are described may be removed.

At action 320, the guest operating system allocates an area of guest memory (e.g., one or more memory pages of the guest memory) for the code module and stores the code module in the allocated area of guest memory. The code module may include a signature (e.g., the code module may be a signed code module).

In some examples, the allocating of the area of guest memory and storing of the code module in the allocated area of guest memory is triggered by execution of one or more instructions in a kernel of the guest operating system. The one or more instructions may be, for example, an instruction to load a driver, dynamic library, or other kernel module into the kernel. Accordingly, upon executing the one or more instructions, the guest operating system stores the code module in an area of guest memory.

At action 322, the guest operating system modifies the code and/or data of the stored code module by applying relocations to the relocation entries of the code module. In the present example, the guest operating system applies the relocations (e.g., using the symbol addresses included in the symbol table entries sent to the hypervisor at action 206). Symbol table entries may be stored in guest memory such that the guest operating system may access the symbol table entries after they are sent to the hypervisor.

In the present example, the guest operating system applies the relocations by matching the symbol strings included in the relocation entries of the stored code module with the symbol strings of the symbol table entries. For example, a relocation entry may include a symbol string, a relative address that is an offset from a base address, and a pointer to a location in the code/data of the verified code module. A symbol table entry may include the same symbol string and a particular virtual address to use as the base address. For each relocation entry that includes a symbol that matches a symbol included in a symbol table entry, the offset provided by the relocation entry is added to the base address provided by the symbol table entry. The address that results from the addition of the base address and the offset is stored at the location referenced by the relocation entry. Accordingly, the code and/or data of the stored code module is updated to specify a fixed/absolute address.

The guest operating system may similarly apply relocations to other portions of the code and/or data based on the matching between the symbol table entries and the relocation entries, the adding of the base addresses and offsets, and the updating of the code and/or data with the results of the addition. In other examples, relocations may be applied to the stored code module in other ways.

At action 324, the hypervisor protects the modified code module from further modification by the guest operating system. In some examples, the hypervisor protects the modified code module by marking memory pages in the area of guest memory where the modified code module is stored as non-writable and non-executable by the guest operating system. In some examples, the hypervisor's protecting of the guest memory is performed responsive to receiving a notification from the guest that it has finished applying the relocations.

At action 326, the hypervisor copies the modified code module from the area of guest memory to another location that is protected from guest access. For example, the hypervisor may allocate a portion of host memory that is not included in the guest memory. Accordingly, the guest may not have access privileges to access the allocated portion of memory. In another example, the hypervisor may allocate a portion of the guest memory and set the privileges of the portion of guest memory such that the guest is unable to write to the guest memory. The allocated portion of host memory or guest memory may be temporarily used by the hypervisor for validating the code module.

At action 328, the hypervisor reverses the relocations from the copied code module. In the present example, the reversing of the relocations from the copied code module includes reverting the code and/or data to include the addresses that were stored prior to performing action 322.

In some examples, the hypervisor reverses the relocations the copied code module by matching the symbol strings of the symbol table entries with the symbol strings of the relocation entries of the copied code module. For each symbol table entry that has a symbol string that matches with a symbol string of a relocation entry, the hypervisor may subtract the address provided by the symbol table entry from the address included in the code and/or data at the location pointed to by the relocation entry. The modifying of the code and/or data pointed to by the relocation entries to undo the applying of the relocations from action 322 may be referred to as reversing the relocations. In other examples, the addresses stored in the code and/or data may be restored in other ways.

At action 330, once the relocations have been reversed, the hypervisor verifies the copied code module.

The verification may be performed by inputting the public key corresponding to the guest operating system and the signature corresponding to the copied code module into a decryption algorithm to decrypt the signature. The decrypted signature may be compared with the copied code module to determine a match.

In some examples, the decrypted signature is compared via a byte by byte matching with the copied code module. In other examples, the decrypted signature includes a hash corresponding to the copied code module. In these examples, the hypervisor may calculate a hash corresponding to the copied code module and compare the hash with the hash obtained from the decrypted signature.

Accordingly, the hypervisor determines whether the signature matches the copied code module. In the event of a successful match, the hypervisor identifies the copied code module as verified. Otherwise, if the signature does not match the copied code module, the hypervisor may notify the guest operating system that there is an error corresponding to the verification of the code module. The hypervisor may also log an error corresponding to the verification failure.

If the hypervisor was able to verify the code module, the method may proceed at action 332.

At action 332, after verifying the copied code module, the hypervisor allows the guest operating system to execute the modified code module. For example, the hypervisor may allow the guest operating system to execute the modified code module by modifying access privileges of the area of guest memory (e.g., one or more guest memory pages) that stores the modified code module to provide the guest operating system with execute access privileges. The hypervisor may then return execution back to the guest operating system so that the guest operating system may execute the modified code module.

Figure 4:
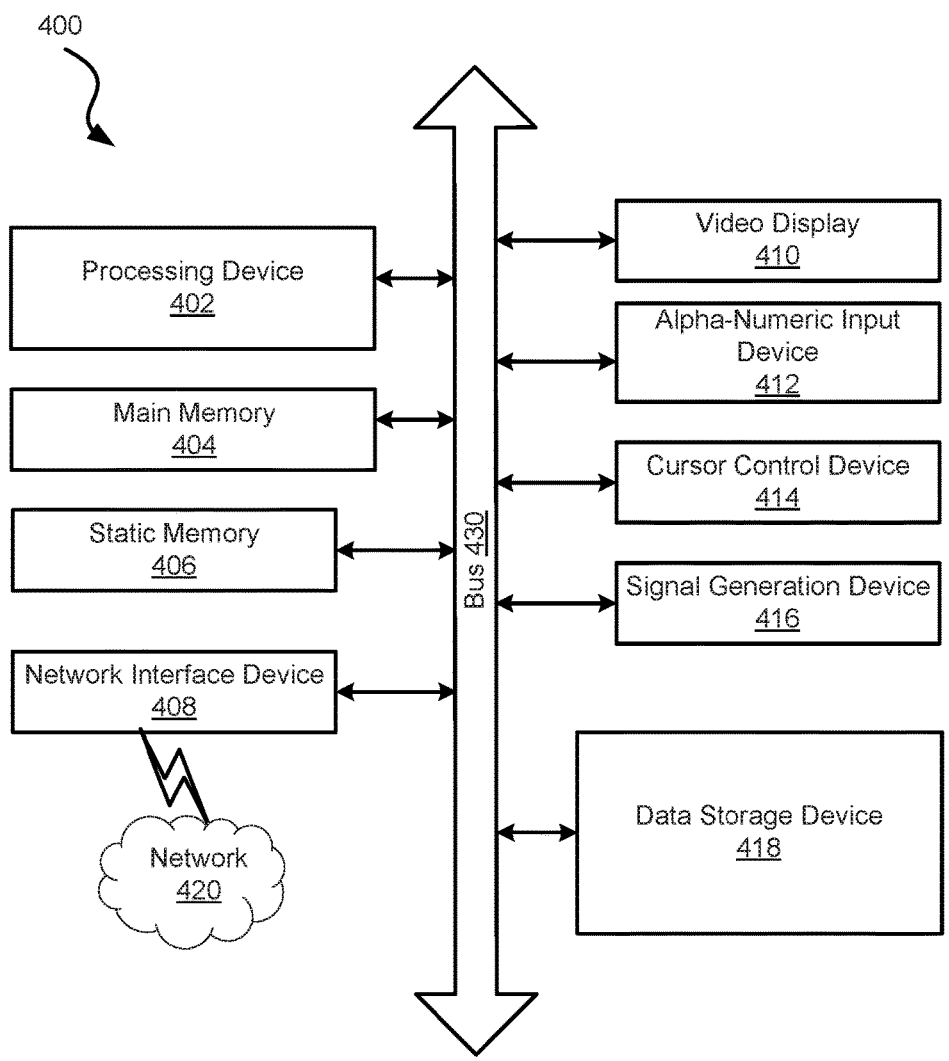
FIG. 4 is an organizational diagram illustrating a computing system suitable for implementing one or more examples of the present disclosure, in accordance with various examples of the present disclosure.

FIG. 4 is an organizational diagram illustrating a computing system 400 suitable for implementing one or more examples of the present disclosure. In the computer system 400, a set of instructions may be executed to perform any one or more of the methodologies discussed herein. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may be used to implement one or more embodiments of the present disclosure. For example, with respect to FIG. 1, the computer system 400 may provide host hardware 104 that executes computer-readable instructions to provide a hypervisor 110, virtual machine 112, and virtual machine(s) 118.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408 that is structured to transmit data to and from the network 420.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

The network 420 may include any combination of public and/or private networks. The network 420 may include one or more network devices and transport media that are communicatively coupled via transport media. For example, network devices may include routers, hubs, switches, and so forth. Transport media may include, for example, Ethernet cable, Fibre Channel Cable, wireless signals, and so forth.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "transmitting," "comparing," "matching," "ordering," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for code loading, the method comprising:
providing, by a hypervisor, a virtual machine that includes a guest operating system;
providing, by the guest operating system, a decryption key, one or more symbol entries, a signed code module, and one or more relocation entries corresponding to the signed code module, wherein the decryption key and the one or more symbol entries are provided to the hypervisor during a boot sequence of the guest operating system, and wherein after the boot sequence the decryption key and the one or more symbol entries include a protection from modification;
receiving, at the hypervisor, the one or more symbol entries, the signed code module and the one or more relocation entries;
verifying, by the hypervisor, the signed code module;
applying, using the one or more symbol entries, one or more relocations of the one or more relocation entries to the signed code module; and
after verifying the signed code module, allowing the guest operating system to execute the signed code module.

2. The method of claim 1, wherein receiving the signed code module comprises:
receiving an address that references a location of the signed code module.

3. The method of claim 1, wherein receiving the signed code module comprises:
copying the signed code module from a first location to a second memory location.

4. The method of claim 1, wherein the signed code module comprises a code module and a signature corresponding to the code module.

5. The method of claim 4, wherein the signature is generated based on an input of the code module and an encryption key into a signature generation module, wherein the encryption key is a member of a key pair with the decryption key.

6. The method of claim 1, wherein the hypervisor stores the signed code module in one or more memory pages that are non-writable by the guest operating system.

7. The method of claim 1, wherein allowing the guest operating system to execute the signed code module comprises:
marking, by the hypervisor, one or more memory pages corresponding to the signed code module as executable.

8. The method of claim 1, wherein allowing the guest operating system to execute the signed code module comprises:
copying, by the hypervisor, the signed code module to one or more memory pages that are executable by the guest operating system.

9. The method of claim 1, wherein the guest operating system comprises a kernel.

10. The method of claim 1, further comprising:
receiving, at the hypervisor, a symbol entry from the guest operating system;
matching a symbol string corresponding to the symbol entry with one or more symbol strings of the one or more symbol entries; and
based on the matching, rejecting the symbol entry.

11. The method of claim 1, further comprising:
receiving, at the hypervisor, a symbol entry from the guest operating system;
determining that a symbol string corresponding to the symbol entry does not match any symbol strings of the one or more symbol entries; and
based on the determining, accepting the symbol entry.

12. The method of claim 1, wherein the guest operating system applies the one or more relocations to the signed code module,
wherein the one or more relocations are applied prior to verifying the signed code module, and
wherein verifying the signed code module comprises:
copying the signed code module;
reversing the applying of the one or more relocations from the copy of the signed code module; and
verifying the copy of the signed code module.

13. The method of claim 1, wherein applying the one or more relocations to the signed code module is performed by the hypervisor, and wherein applying the one or more relocations is performed after verifying the signed code module.

14. A non-transitory machine-readable medium having stored thereon machine-readable instructions executable to cause a machine to perform operations comprising:
providing, by a hypervisor, a virtual machine that includes a guest operating system;
communicating, from the guest operating system to the hypervisor, a code module, a signature corresponding to the code module, a decryption key, and a symbol entry, wherein the decryption key and the symbol entry are communicated to the hypervisor during a boot sequence of the guest operating system, and wherein after the boot sequence the decryption key and the symbol entry include a protection from modification;
verifying, by the hypervisor, the code module;
after verifying the code module, applying a relocation to the code module, wherein the relocation is at least partly based on an address provided by the symbol entry; and
after applying the relocation, allowing the guest operating system to execute the code module.

15. The non-transitory machine-readable medium of claim 14, wherein the signature is generated based on an input of the code module and an encryption key into a signature generation module, and wherein the encryption key is a member of a key pair with the decryption key.

16. The non-transitory machine-readable medium of claim 14, wherein applying the relocation comprises: incrementing an offset provided by a relocation entry of the code module, wherein the offset is incremented by the address provided by the symbol entry.

17. The non-transitory machine-readable medium of claim 14, wherein the verifying comprises:
decrypting the signature using the decryption key to generate a decrypted signature; and
matching the decrypted signature with the code module.

18. A code loading system comprising:
a non-transitory computer readable medium that stores a signed code module;
a processor that executes a hypervisor to provide a virtual machine that includes a guest operating system;
the guest operating system to send, to the hypervisor, a decryption key, one or more symbol entries, the signed code module, a key corresponding to the signed code module, and one or more relocation entries corresponding to the signed code module, wherein the decryption key and the one or more symbol entries are sent to the hypervisor during a boot sequence of the guest operating system, and wherein after the boot sequence the decryption key and the one or more symbol entries include a protection from modification;
the hypervisor to:
receive the decryption key, the one or more symbol entries, the signed code module, the key, and the one or more relocation entries;
verify, using the key, the signed code module;
after verifying the signed code module, apply a relocation to the signed code module, wherein the relocation corresponds at least in part to an address provided by the one or more symbol entries; and
after applying the relocation, provide the guest operating system with access to execute the signed code module.

19. The code loading system of claim 18, wherein receiving the signed code module includes at least one of: (1) receiving an address that references a location of the signed code module or (2) copying the signed code module from a first location to a second memory location.

20. The code loading system of claim 18, wherein the signed code module comprises a code module and a signature corresponding to the code module.

* * * * *